US008896625B2

(12) United States Patent
Chen et al.

(10) Patent No.: US 8,896,625 B2
(45) Date of Patent: Nov. 25, 2014

(54) METHOD AND SYSTEM FOR FUSING IMAGES

(75) Inventors: Hai Chen, Shenzhen (CN); Lingzhi Liu, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 375 days.

(21) Appl. No.: 12/455,930

(22) Filed: Jun. 8, 2009

(65) Prior Publication Data

US 2010/0103194 A1 Apr. 29, 2010

(30) Foreign Application Priority Data

Oct. 27, 2008 (CN) .......................... 2008 1 0225061

(51) Int. Cl.
*G09G 5/00* (2006.01)
*H04N 5/235* (2006.01)
(Continued)

(52) U.S. Cl.
CPC ................ *H04N 5/2351* (2013.01); *G06T 5/50* (2013.01); *H04N 5/2355* (2013.01);
(Continued)

(58) Field of Classification Search
CPC .......... G06G 5/14; G06T 11/00; G06T 19/00; G06T 5/50; G06T 2207/20208; G06T 2207/20221; H04N 5/2351; H04N 5/2352; H04N 5/2355; H04N 5/2356; H04N 5/14; H04N 5/235
USPC ................ 345/629, 581, 589, 690, 694, 617; 382/162, 167, 168, 169, 232, 254, 274, 382/294
See application file for complete search history.

(56) References Cited

U.S. PATENT DOCUMENTS 5,828,793 A * 10/1998 Mann ............................ 382/284
6,650,774 B1 * 11/2003 Szeliski ........................ 382/169
(Continued)

FOREIGN PATENT DOCUMENTS

CN 101052100 A 10/2007
CN 101098411 A 1/2008
(Continued)

OTHER PUBLICATIONS

Tom Mertens et al, "Exposure Fusion", In Prodc. of the 15th Pacific Conference on Computer Graphics and Applications, Oct. 29, 2007, pp. 382-390, IEEE, Piscataway, NJ, USA.*
(Continued)

*Primary Examiner* — Jin-Cheng Wang
(74) *Attorney, Agent, or Firm* — Leydig, Voit & Mayer, Ltd.

(57) ABSTRACT

A method and a system for fusing images in an image processing field are described. The method includes: capturing at least two frames of images having different intensity under different exposure time in the same scene; fusing the images having different intensity values according to an intensity mapping relation between every two frames of images in the images having different intensity values, and obtaining a fused image is, in which the intensity mapping relation represents a corresponding relation between an intensity value of a pixel location in a bright image and that at the corresponding location in a dark image. Through the method and the system for fusing the images according to the present invention, the dynamic range of the image is enhanced, and the fusing process has a desired result and is easy to implement.

14 Claims, 8 Drawing Sheets
(4 of 8 Drawing Sheet(s) Filed in Color)

(51) Int. Cl.
*G06T 5/50* (2006.01)
*G06T 11/00* (2006.01)
*G09G 5/14* (2006.01)
*G06T 19/00* (2011.01)

(52) U.S. Cl.
CPC ............ *H04N 5/2356* (2013.01); *H04N 5/2352* (2013.01); *G06T 11/00* (2013.01); *G09G 5/14* (2013.01); *H04N 5/235* (2013.01); *G06T 19/00* (2013.01); *G06T 2207/20208* (2013.01); *G06T 2207/20221* (2013.01)
USPC ........... 345/629; 345/589; 345/690; 345/617; 345/694; 382/162; 382/167; 382/168; 382/169; 382/232; 382/254; 382/274; 382/294; 348/229.1; 348/654

(56) References Cited

U.S. PATENT DOCUMENTS

| | | | |
|---|---|---|---|
| 6,738,510 B2* | 5/2004 | Tsuruoka et al. | 382/167 |
| 6,850,642 B1 | 2/2005 | Wang | |
| 6,879,731 B2 | 4/2005 | Kang et al. | |
| 2003/0095192 A1* | 5/2003 | Horiuchi | 348/222.1 |
| 2004/0218830 A1 | 11/2004 | Kang et al. | |
| 2006/0104533 A1 | 5/2006 | Daly et al. | |
| 2006/0140510 A1 | 6/2006 | Wallace et al. | |
| 2006/0177150 A1* | 8/2006 | Uyttendaele et al. | 382/284 |
| 2007/0269132 A1 | 11/2007 | Duan et al. | |
| 2007/0286523 A1 | 12/2007 | Kim et al. | |
| 2008/0219581 A1* | 9/2008 | Albu et al. | 382/261 |
| 2009/0027558 A1* | 1/2009 | Mantiuk et al. | 348/673 |
| 2009/0278857 A1* | 11/2009 | Wajs | 345/629 |
| 2010/0165135 A1* | 7/2010 | Kalevo | 348/221.1 |

FOREIGN PATENT DOCUMENTS

| | | |
|---|---|---|
| CN | 101102417 A | 1/2008 |
| CN | 101394487 B | 9/2011 |

OTHER PUBLICATIONS

Benjamin Guthier et al. "Capturing High Dynamic Range Images with Partial Re-exposure", In Proc. of the 2008 IEEE 10th Workshop on Multimedia Signal Processing (MMSP 2008), Oct. 8, 2008, pp. 241-249, IEEE, Piscataway, NJ, USA.*

Luiz Velho, "Histogram-Based HDR Video", In SIGGRAPH 2007 ACM SIGGRAPH 2007 posters, p. 62, New York, NY, USA, 2007.*

Lukas Cerman, "High Dynamic Range Images from Multiple Exposures", Diploma Thesis, Czech Technical University in Prague Faculty of Electrical Engineering, Jan. 26, 2006.*

State Intellectual Property Office of the People's Republic of China, Examination Report in Chinese Patent Application No. 200810225061.2 (Mar. 1, 2010).

GB Intellectual Property Office—Patents Directorate, Combined Search and Examination Report in Great Britain Patent Application No. 0909567.0 (Oct. 8, 2009).

* cited by examiner

METHOD AND SYSTEM FOR FUSING IMAGES

CROSS-REFERENCE TO RELATED APPLICATIONS

This application claims priority to Chinese Patent Application No. 200810225061.2, filed on Oct. 27, 2008, which is incorporated herein by reference in its entirety.

FIELD OF THE INVENTION

The present invention relates to an image processing field, and more particularly to a method and a system for fusing images.

BACKGROUND

In real world, an intensity dynamic range is $10^8$:1, and the dynamic range that could be sensed by human eyes is quite large. The human eyes may perceive the starlight having the intensity of $10^{-3}$ $cd/m^2$, and may also sense the sunlight having the intensity of $10^5$ $cd/m^2$. The human eyes may perceive every detail in the real scenes under quite bright and dark situations. It may be known that through the automatic adjustment of the human eye pupils, the intensity dynamic range capable of being recognized by the human eyes is approximately $10^8$:1. Even in the same scene, the human eyes may recognize the intensity dynamic range of $10^5$:1 without any adjustment.

The intensity dynamic range of recent image capturing devices (such as digital image capturing devices and video cameras) is relatively low, so the relevant details cannot be seen in the especially bright scenes, and the relevant dark details cannot be captured in the especially dark parts. Therefore, the capturing device cannot match with the demand of the practical scene and the intensity dynamic range capable of being sensed by the human eyes. In the surveillance application, such as the surveillance on the express way, capturing at night, and capturing for sunrise and sunset, it includes the high light source, such as front and back lights of vehicles, street lights, sun, and surfaces with the high reflectivity, directly facing the lens of the image capturing device and the details having the low intensity, such as shadows, sceneries behind the light source, and other regions cannot be irradiated by the lights. Usually in these occasions, we have to adjust the exposure time. However, for some cases, it is impossible to capture all the details in the high light region or that in the low light region of the high contrast scene through adjustment. Therefore, it is necessary to provide various methods for enhancing the capability of capturing the details and the corresponding intensity dynamic range of the image capturing device.

The images having the high dynamic range fused by recently popular methods in the academic community, usually has to calibrate a response curve of the image capturing device by an optimizing manner. A high dynamic range (HDR) image is calculated according to the response curve of the image capturing device and an image sequence captured under different exposure situations. Visually, HDR image ranged from 0 to $10^5$ or even larger is calculated by the image sequence with pixel values of 0-255. To display such HDR image on a common display device, a tone mapping operator are performed on the obtained HDR image (the 0-$10^5$ HDR image is mapped to a common 0-255 image).

In the prior art, a technical solution uses an image capturing device to capture the image. The exposure time of each frame is set according to the pixel intensity distribution before capturing. The images having the long and the short exposure time are captured alternate. The pixels between each frame and the neighboring frames are determined at the stage of initializing frame. The intensity range of the corresponding frame is calculated by a relevant pixel selected from the corresponding pixel. The intensity range of the frame is concerted into a common 8-bit image by the tone mapping.

After analyzing the prior art, the inventor finds some problems as follows.

In the prior art, it is necessary to frequently calibrate the response curve of the image capturing device, as the response curve changes with some environmental characteristics, for example, the temperature. During the tone mapping stage, the mostly popular method with the best effect is based on a self-adaptive tone mapping algorithm. However, this process may irreversibly damage the good physical characteristics maintained by the two complicated calibrations and the heavy computation mentioned above, for example, the intensity value of the image is proportional to the scene intensity and irrelevant to the exposure time etc. More, this is of a high computational complexity. Thus, it is difficult to implement as one realtime system, and the fused image is not satisfactory.

SUMMARY

Various embodiments of the present invention provide a method and system for fusing images, which is easily implemented and the final result is competitive.

The technical solution is described as follows.

A method for fusing images includes the steps as follows.

At least two frames having different intensity values are captured under different exposure time in the same scene The images having different intensity values are fused according to an intensity mapping relation defined by each two frames of images in the images having different intensity values, and a fused image is obtained. The intensity mapping relation represents a corresponding relation between an intensity value of a pixel location in a bright image and an intensity value of a pixel location at a corresponding position in a dark image.

A system for fusing images includes a capturing module and a fusing module.

The capturing module is adapted to capture at least two frames of images having different intensity values under different exposure time in the same scene.

The fusing module is adapted to fuse the images having different intensity values according to an intensity mapping relation defined by each two frames of images in the images having different intensity values, and obtain a fused image. The intensity mapping relation represents a corresponding relation between an intensity value of a same pixel location in a bright image and an intensity value of a pixel location at a corresponding position in the dark image.

The technical solution of the present invention has the advantages as follows. At least two frames having different intensity values are captured under different exposure time in the same scene. The images having different intensity values are fused having the intensity mapping relation defined by each two frames of images in the images having the different intensity values, and the fused image is obtained. The present invention is easily implemented as the low computational cost, and the fused image is satisfactory.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION

The technical solution of the present invention is clearly and completely described with the accompanying drawings in the present invention. Distinctly, the described embodiments are only one part of the embodiments of the present invention, but are not all the embodiments. Based on the embodiments of the present invention, all the other embodiments obtained by those of ordinary skill without any creative works are within the protection scope of the present invention.

Embodiment 1

Figure 1:
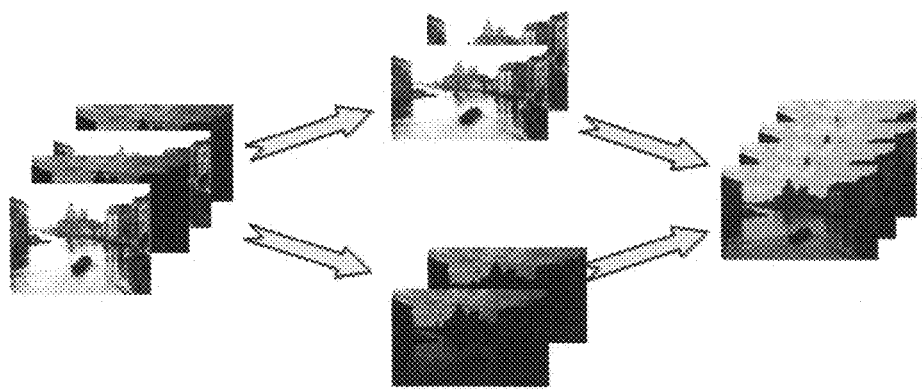
FIG. 1 is a schematic flow chart of a method for fusing images according to embodiment 1 of the present invention.

One embodiment of the present invention provides a method for fusing images. At least two frames of images having different intensity values under different exposure time in the same scene are captured. The plurality of frames of images having different intensity values are fused according to an intensity mapping relation between each two frames of images in the images having different intensity values, and a fused image is obtained. Referring to FIG. 1, it is a schematic description view of fusing a video image sequence. For example, a camera is used as an image capturing device, and a video image frame sequence having different intensity values in the current scene is obtained by the camera. The images having different intensity values may be obtained by controlling the exposure. The bright image having the bright exposure has most of the details of the dark part in the scene, but may lose the details of the bright part in the scene. The dark image having the short exposure has most of the details of the bright part in the scene, but may lose the details of the dark part in the scene. Therefore, the image frames having different intensity values in the same scene are fused, so as to keep all the image details in the bright and the dark images, and to obtain a frame image of a high dynamic range (HDR) video, thereby enhancing the dynamic range of the video image. That is to say, the two frames of the image frames having different exposures are fused, so as to obtain the HDR video in the current scene.

Figure 2:
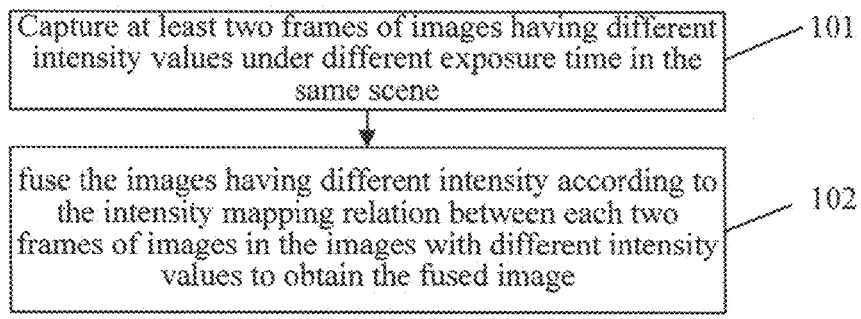
FIG. 2 is a schematic description view of fusing a video image sequence according to embodiment 1 of the present invention.

Referring to FIG. 2, the method includes the steps as follows.

Step 101: At least two frames of images having different intensity values under the different exposure time in the same scene are captured.

Under the different exposure time, the at least two frames of images having different intensity values including the bright exposure image and the dark exposure image are captured. Hereinafter, the bright exposure image is called the bright image, and the dark exposure image is called the dark image. The bright and the dark are relative. In the two frames of the different images, the relatively bright one is the bright image, and the relatively dark one is the dark image. For the camera and other capturing devices, the successively captured several frames of images having different exposures in the same scene is serially output. For ease of fusing, firstly the captured images may be stored, then the data of the stored images is synchronized with the data of the last captured images, and finally all the images to be fused are output in parallel.

For example, if 2 frames of images are to be fused, a frame of the bright image and a frame of the dark image are required. Under the two types of exposures situation, the bright exposure image is firstly captured and stored. Then, the data of the bright exposure image is synchronized with the data of the later captured dark exposure image, and an image pair is output in parallel through two paths. Here, the image pair refers to the bright image and the dark image in the same scene.

In one embodiment of the present invention, a double data rate (DDR) storage stores the previous frame of image, and the DDR may reach the relatively desired balance between the cost and the performance.

The number of the frame caches depends on the number of the images to be fused.

In one embodiment, the two inputs of the images are fused to the image having the enhanced dynamic range, so that one frame cache is adopted to align frame heads of the two inputs of the images for synchronizing. If the images having n types of exposure time are fused to the image having the enhanced dynamic range, n−1 frame caches are required, so as to ensure that the inputs having n types of different exposures may be obtained at any moments, the data output from each frame cache is synchronized with a real-time data stream, and finally the images are output in parallel.

Step 102: The images having different intensity values are fused according to the intensity mapping relation between each two frames of images in the images having different intensity values, and the fused image is obtained. The intensity mapping relation represents a corresponding relation between an intensity value of a pixel location in the bright image and an intensity value of a pixel location at a corresponding position in the dark image.

After capturing the at least two frames of images having different intensity values under the different exposure time in the same scene, the method further includes the steps as follows.

An intensity mapping function f(x) between each two frames of images is calculated according to an intensity histogram and an intensity cumulative histogram of each frame of image, in which x represents the intensity value of the pixel location in the bright image, and f(x) represents the intensity value of the pixel location of the corresponding position in the dark image.

Each group of x and f(x) is referred to as a mapping pair, and a value obtained by subtracting f(x) from x is referred to as a mapping difference.

A mapping pair is determined, and the determined mapping pair is used as the mapping relation.

For ease of description, the two frames of images captured under the two exposure situations, that is, the bright exposure and the dark exposure are set as an example for description.

Referring to FIGS. 3(a) and 3(b), the images captured under the bright exposure and the dark exposure situations are shown, FIG. 3(a) shows the bright exposure image, and the FIG. 3(b) shows the dark exposure image. FIG. 4(a) shows the intensity histogram of the bright and the dark images. The horizontal axis of the intensity histogram represents the intensity levels, from the left 0 (dark tone) to the right 255 (bright tone), the intensity levels of the image are divided into 256 levels. The vertical axis represents the number of the pixels under each intensity level. The numerical value points on the vertical axis are connected, so as to obtain the intensity histogram. FIG. 4(b) is the intensity cumulative histogram of the bright and the dark images, in which a curve 1 represents the bright exposure image, and a curve 2 represents the dark exposure image. FIG. 4(c) is an intensity mapping function view calculated according to the intensity histogram of the bright and the dark images as shown in FIG. 4(a) and the intensity cumulative histogram as shown in FIG. 4(b), in which the calculating process is the same as that of the prior art, so it is not described here. The horizontal coordinate of the intensity mapping function view represents the pixel of the bright image, and the vertical coordinate of the intensity mapping function view represents the pixel of the dark image. The intensity mapping function may be understood as that the pixel having the intensity value of x in the bright image should be f(x) in the dark image, in which x>=f(x). In the discrete area, f should be a many-to-many function. However, f may be understood as a successive function, so that f becomes a monotonously incremental function. In the detail calculation, x and f(x) are rounded down for calculation, if other numerical values are used, the result is not affected, in which a difference between x and f(x) is the mapping difference.

The intensity information includes any one or several combinations of the exemplified information as follows: the number of the dark pixels or the number of the bright pixels in the bright image, the number of the bright pixels or the dark pixels in the dark image, the total or the partial average value of the bright and the dark images, and the mid value and the mapping difference of the bright and the dark images etc.

In one embodiment, a mapping pair $(x_{max}, f(x_{max}))$ corresponding to the maximum mapping difference $EDR_{max}$ is used as the mapping information.

$$EDR_{max} = \max\{x-f(x)\}\ x \in [0,255] \quad (1)$$

The mapping pair corresponding to the maximum mapping difference is selected as the mapping information, so that the dynamic range of the finally fused image is the maximum. Definitely, the mapping pairs corresponding to other mapping differences may be selected as the mapping information, that is, in the intensity mapping function curve, x and the corresponding f(x) is the mapping pair serving as the mapping information.

Being an important index in the solution, EDR may directly measure the enhanced dynamic range, and may represent whether the current exposure time is appropriate or not.

For the multi-exposure situation, that is, the image to be fused includes more than two images having different exposures, the images are sequenced from bright to dark according to the different exposure time, and one intensity mapping function $f_n$ may be calculated between each two neighboring images. Formula 1 thus becomes Formula (2). It is easily known that the EDR of the n frames is practically a sum of the irrelevant EDRs of n-1 2 frames. Similarly, the mapping information is as follows.

$$\begin{cases} (x_{max1}, f_1(x_{max1})), (x_{max2}, f_2(x_{max2})) \dots \\ (x_{max(n-1)}, f_{(n-1)}(x_{max(n-1)})) \end{cases} \quad (2)$$

$$EDR_{maxk} = \max\{x_k - f_k(x_k)\} x_k \in [0,255]$$

$$EDR_{max} = \sum_{i=1}^{n-1} EDR_{maxi}$$

The method further includes the steps as follows.

A statistics is made on the histograms of the images, and the intensity information is obtained.

Reference exposure time and exposure dynamic time are adjusted according to the intensity information, and the exposure time of each frame of image for a next capturing is calculated according to the reference exposure time and the exposure dynamic time.

Figure 5:
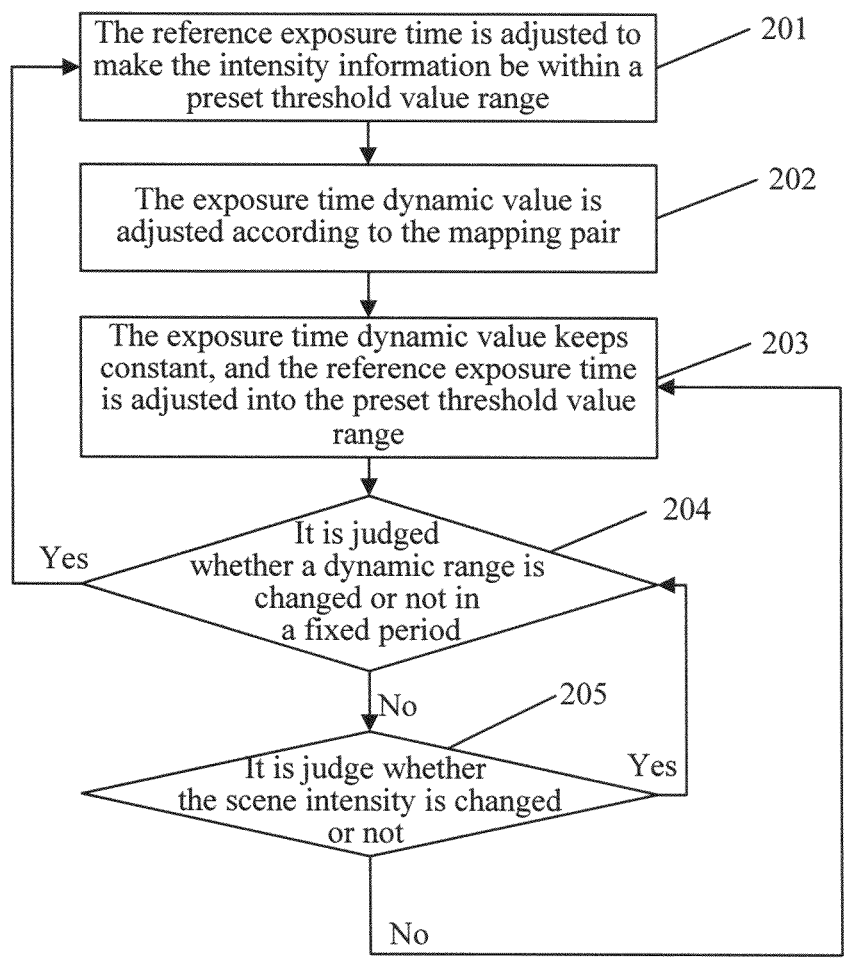
FIG. 5 is a schematic flow chart of a process of controlling an exposure according to embodiment 1 of the present invention.
Figure 6:
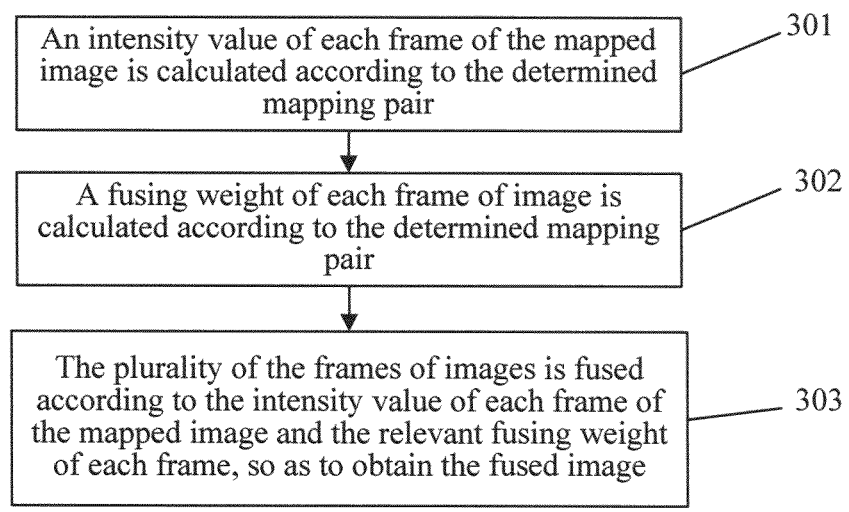
FIG. 6 is a schematic flow chart of a fusing process according to embodiment 1 of the present invention.

The reference exposure time and the exposure dynamic time are adjusted according to the intensity information. An automatic multi-exposure controlling method is provided according to one embodiment of the present invention. Referring to FIG. 5, the method adjusts the exposure time according to an exposure reference (ER) value and an exposure dynamic (ED) range value. The reference exposure time is set to Ter, the reference exposure time is a reference value of the exposure time capable of representing the scene intensity, so as to avoid the exposure image sequence from being too bright or too dark. The reference exposure time is usually the mid value of the exposure time sequence in the multi-exposure, the dark exposure time is Td, and the bright exposure time is Tb. The exposure time dynamic value is Ted, the exposure time dynamic value is an offset coefficient of the multi-exposure time, and is adapted to determine the intensity dynamic range capable of being covered by the multi-exposure sequence. The exposure time dynamic value is usually the difference value of the neighboring exposure time in the multi-exposure, or may be a ratio of the neighboring exposure time.

The method includes the steps as follows.

Step 201: The reference exposure time Ter is adjusted, so that the intensity information is within a first preset threshold value range.

Under the dual-exposure situation, it is specified that Ter=Td. Under the n-exposure situation, it is specified that the reference exposure time Ter is the value of the n/2th exposure image sequence from dark to bright: Ter=T(n/2).

Step 202: The exposure time dynamic value Ted is adjusted according to the mapping pair, so that the exposure time dynamic value Ted may well cover the scene intensity.

In one embodiment, Ted is adjusted by adopting the maximum mapping difference $EDR_{max}$, and under the dual-exposure situation, a desired effect may be obtained when the value of $EDR_{max}$ is between 140 and 180.

Step 203: The exposure time dynamic value Ted is kept constant, and the reference exposure time is adjusted into a second preset threshold value range.

Step 204: It is judged whether a dynamic range is changed or not in a fixed period, and if the dynamic range is changed, the procedure returns to Step 201; if the dynamic range is not changed, the procedure proceeds to Step 205.

The dynamic range is the ratio of the brightest part to the darkest part of the image.

Step 205: It is judged whether the scene intensity is changed or not, and if the scene intensity is changed, the procedure returns to Step 203; if the scene intensity is not changed, a next period is waited for, and it is judged whether the dynamic range is changed or not.

After finishing the automatic multi-exposure control calculation, under the dual-exposure situation, according to the specification, Ter=Td and Tb=Ter+Ted, and the exposure time of the [bright, dark, bright, dark . . . ] alternating manner is set for the image capturing device according to the practical platform, so as to alternate the exposure.

Under the n types of exposures situation, T(i)=Ter+(i−n/2) Ted, the exposure time of the alternating manner from bright to dark may be set for the image capturing device. For example, 4 types of exposures exist, the 4 types of exposures are sequenced from bright to dark, the exposure time of the 4 types of exposures are respectively 4, 3, 2, and 1, and then, the sequence is circulated, that is, 4, 3, 2, 1, and 4, 3, 2, 1 . . . .

For the high speed image capturing device, the shooting with the total dynamic range is realized by adopting the fixed multi-exposure, and the automatic exposure control is no more required.

The process of fusing the plurality of frames of images having different intensity according to the intensity mapping relation between each two frames of images in the images having different intensity values, and obtaining the fused image includes the steps as follows.

Step 301: An intensity value of each frame of the mapped image is calculated according to the determined mapping pair.

According to one embodiment, the intensity value of the mapping image under the dark exposure is calculated by adopting the mapping pair ($x_{max}$, $f(x_{max})$) corresponding to the maximum mapping difference. It is assumed that $I_1$ is the intensity value of the bright exposure image, and $I_2$ is the intensity value of the dark exposure image, so after being mapped, the intensity value $I_2$ of the dark exposure image is ($I_2+x_{max}-f(x_{max})$).

Step 302: A fusing weight of each frame of image is calculated according to the determined mapping pair.

In one embodiment, $s'_1$ is the fusing weight of the bright exposure image, $s'_1$ is a Gauss weight calculated by using 0 as a center and Xmax as a radius, and a detailed calculating formula is as shown in the formula as follows. $s'_2$ is the fusing weight of the dark exposure image, $s'_2$ is the Gauss weight calculated by using 255 as the center and f(Xmax) as the radius, and the detailed calculating formula is as shown in Formula (3).

$$s'_1 = \exp\left(-4 * \frac{I_1^2}{x_{max}^2}\right)$$

$$s'_2 = \exp\left(-4 * \frac{(255 - I_2)^2}{f(x_{max})^2}\right) \quad (3)$$

For ease of the subsequence calculation, the fusing weight of each image may be normalized. Formula (3) is normalized to form Formula (4).

$$s_1 = \frac{s'_1}{s'_1 + s'_2}$$

$$s_2 = 1 - s_1 \quad (4)$$

Through a simplifying operation, Formula (4) may be simplified to table look-up, addition, and three multiplications.

For the n types of exposures situation, the fusing weight is as shown in Formula (5).

$$s'_k = \begin{cases} \exp\left(-4 * \frac{I_k^2}{x_{max1}^2}\right) & k = 1 \\ \exp\left(-4 * \frac{(2I_k - x_{maxk} - f_{(k-1)}(x_{max(k-1)}))^2}{(x_{maxk} - f_{(k-1)}(x_{max(k-1)}))^2}\right) & k = 2 \ldots (n-1) \\ \exp\left(-4 * \frac{(255 - I_k)^2}{f_{(n-1)}(x_{max(n-1)})^2}\right) & k = n \end{cases} \quad (5)$$

After being normalized, it is as shown in Formula (6)

$$s_k = \frac{s'_k}{\sum_{i=1}^{n} s'_i} \quad (6)$$

Step 303: The plurality of frames of images is fused by using the intensity value of each frame of the mapped image and the fusing weight relevant to each frame, and the fused image is obtained.

Further, for the above example, it is set that the chroma of the bright exposure image is $C_1$, the chroma of the dark exposure image is $C_2$, the intensity I and the chroma C after the weighting superposition are as shown in Formula (7).

$$I = s_1 I_1 + s_2 * (I_2 + x_{max} - f(x_{max}))$$

$$C = s_1 * C_1 + s_2 * C_2 \quad (7)$$

Formula (7) may be simplified to two multiplications and five additions, which may be easily realized in the software and hardware design.

For the situation of n types of exposures, the intensity value of each image is respectively as $I_1, I_2, \ldots, I_n$, and the chroma value of each image is respectively as $C_1, C_2, \ldots, C_n$. The intensity value and the chroma value after the weighting superposition are as shown in Formula (8).

$$I = s_1 * I_1 + \sum_{i=2}^{n} s_i * \left(I_i + \sum_{k=1}^{i-1} x_{maxk} - \sum_{k=1}^{i-1} f_k(x_{maxk})\right) \quad (8)$$

$$C = \sum_{i=1}^{n} s_i * C_i$$

Figure 3:
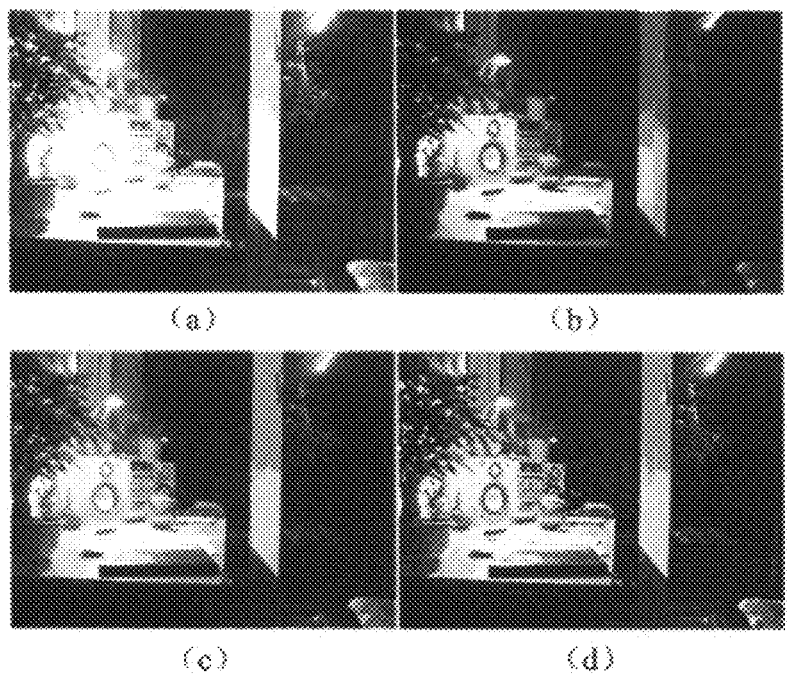
FIGS. 3(*a*)-(*d*) are effect views of captured original images and fused images, according to embodiment 1 of the present invention.
Figure 4:
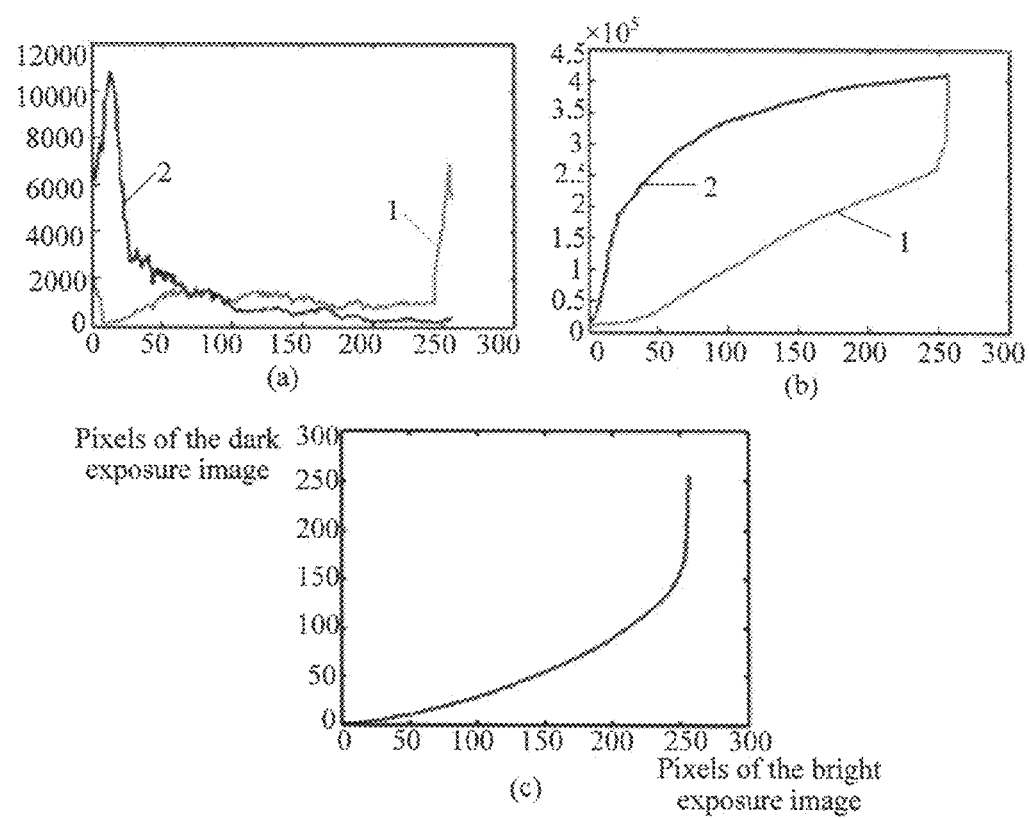
FIGS. 4(*a*)-(*c*) are graphs of intensity mapping functions according to embodiment 1 of the present invention.

The fused image is as shown in FIG. 3(*c*).

Figure 7:
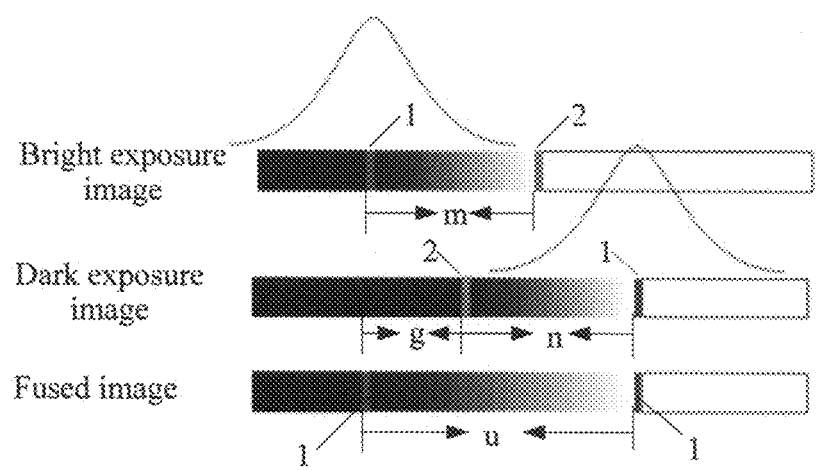
FIG. 7 is a schematic flow of fusing the images having an enhanced dynamic range according to embodiment 1 of the present invention.

FIG. 7 is a schematic flow of fusing the images having the large dynamic range. m is the dynamic range of the image captured under the bright exposure, and n is the intensity dynamic range of the image captured under the dark exposure. The dynamic ranges of the intensity of the captured bright exposure image and the captured dark exposure image capture image are the same. In the drawing, the lengths of m and n are the same, but the captured intensity range interval is changed. For example, as compared with the bright exposure image, in the dark exposure image, the captured interval is moved towards right for a distance of g, so that the valid interval of the dynamic range corresponding to the fused image relevantly becomes m+g. The line 1 in the drawing represents that the scene information here is completed without being lost, the line 2 represents that the scene information here is lost. In the bright exposure image, the scene information on the right of the intensity dynamic range is lost, and in the dark exposure image, the scene information on the left of the intensity dynamic range is lost. In the fused image, the scene information on the two sides of the intensity dynamic range is not lost.

After the step of fusing the images having different intensity values according to the histogram intensity mapping relation between each two frames of images in the images having different intensity values, and obtaining the fused image, the method further includes the steps as follows.

The intensity of the fused image is enhanced.

For example, an intensity channel of the fused image is scaled down, a bilateral filtering is performed, then the scaled-down fused image and the image after the bilateral filtering are superposed, and a new fused image is obtained. The intensity of the new fused image is stronger than the intensity of the fused image obtained in Step 102.

In one embodiment, the proportional coefficient of scaling down the intensity channel is approximately described as follows:

$$\delta = \frac{255}{255 + \sum_{i=1}^{n-1} x_{maxi} - \sum_{i=1}^{n-1} f_i(x_{maxi})}$$

In one embodiment, the bilateral filter formed by mixing the box filtering of the space domain and the triangle filtering of the intensity domain is used for filtering. The reason is that the complexity of the bilateral filter composed of the typical dual-Gauss is much higher than the complexity of the commonly used single filter, and usually the complexity is increased in exponent relative to the window size of the filter, and a great amount of resources is consumed.

After the intensity channel of the image is scaled down and the image is filtered, the image intensity is enhanced to be as follows:

$$I_{en} = \delta * I + \alpha * (I - I_{bilateral})' \qquad (9)$$

where, $I_{en}$ is the intensity of the enhanced image, $I_{bilateral}$ is the intensity of the filtered image, $\alpha$ is a weighting coefficient. When the value of $\alpha$ is 0.5, a relatively good result may be obtained. If the images having multi-exposure are fused, $\alpha$ is increased accordingly.

As shown in Formula. (9), the details of the image may be obtained by subtracting the filtered image from the image before being filtered, and after the weighting superposition is performed on the image having the scaled-down intensity, the HDR image with abundant details may be obtained, as shown in FIG. 3(d).

In the method for fusing the images according to one embodiment, at least two frames of images having different intensity values under the different exposure time in the same scene are captured. The plurality of frames of images having different intensity values are fused according to the intensity mapping relation between each two frames of images, and the fused image is obtained. In the method, the structure of the existing image capturing device, for example, the camera is not need to alter, and the method may be realized by using an exposure setting function and an additive software module of the existing image capturing device. The method has a wide application range, and the method may be integrated to a system of the image capturing device and monitoring device, or may be used as the post processing software. The method has a good expandability, and is easily updated later. The method has better fusing effect than that of the common image capturing device. The details are distinctive, particularly in the scene having the high intensity value and the low intensity value, the feature details having the large intensity range may be clearly obtained. The fused image does not have the fused artifacts, it is smooth and natural in the bright and the dark regions, and the switching region between the bright and the dark is wholly uniform. The images are output in parallel, so that the frame rate of the image capturing device is not reduced, and the output image frequency is equal to the output frame rate of the original image capturing device. The algorithm is practical and efficient, so that the real-time implement is achieved without increasing the hardware cost.

Embodiment 2

One embodiment of the present invention provides a system for fusing images. At least two frames of images having different intensity values under different exposure time in the same scene are captured. The plurality of frames of images having different intensity values are fused according to an intensity mapping relation between each two frames of images in the images having different intensity values, and a fused image is obtained. Referring to FIG. 1, it is a schematic description view of fusing a video image sequence. For example, a camera is used as an image capturing device, and a video/image frame sequence having different intensity values in the current scene is obtained by the camera. The images having different intensity values may be obtained by controlling the exposure. The bright image having the bright exposure has most of the details of the dark part in the scene, but may lose the details of the bright part in the scene. The dark image having the short exposure has most of the details of the bright part in the scene, but may lose the details of the dark part in the scene. Therefore, the image frames having different intensity values in the same scene are fused, so as to keep all the image details in the bright and the dark images, and to obtain a frame of a high dynamic range (HDR) video/image, thereby enhancing the dynamic range of the video/image. That is to say, the two frames of the image frames having different exposures are fused, so as to obtain the HDR video in the current scene.

Figure 8:
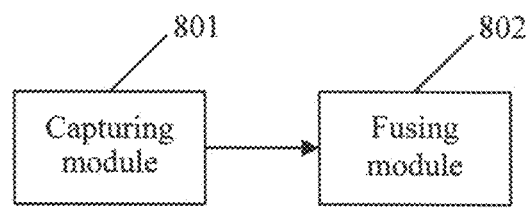
FIG. 8 is a schematic structural view of a system for fusing images according to embodiment 2 of the present invention.

Referring to FIG. 8, the system includes a capturing module 801 and a fusing module 802.

The capturing module 801 is adapted to capture at least two frames of images having different intensity values under the different exposure time in the same scene.

Under the different exposure time, the at least two frames of images having different intensity values including the bright exposure image and the dark exposure image are captured. Hereinafter, the bright exposure image is called the bright image, and the dark exposure image is called the dark image. The bright and the dark are relative. In the two frames of the different images, the relatively bright one is the bright image, and the relatively dark one is the dark image. For the camera and other capturing devices, the successively captured several frames of images having different exposures in the same scene is serially output. For ease of fusing, firstly the captured images may be stored, then the data of the stored images is synchronized with the data of the last captured images, and finally all the images to be fused are output in parallel.

For example, if 2 frames of images are to be fused, a frame of the bright image and a frame of the dark image are required. Under the two types of exposures situation, the bright exposure image is firstly captured and stored. Then, the data of the bright exposure image is synchronized with the data of the later captured dark exposure image, and an image pair is output in parallel through two paths. Here, the image pair refers to the bright image and the dark image in the same scene.

In this embodiment of the present invention, a double data rate (DDR) storage stores the previous frame of image, and the DDR may reach the relatively desired balance between the cost and the performance.

The number of the frame caches depends on the number of the images to be fused.

In one embodiment, the two paths of the images are fused to the image having the enhanced dynamic range, so that one frame cache is adopted to align frame heads of the two paths of the images for realizing the synchronization. If the images having n types of exposure time are fused to the image having the enhanced dynamic range, n−1 frame caches are required, so as to ensure that the inputs with n types of different exposures may be obtained at any moments, the data output from each frame cache is synchronized with a real-time data stream, and finally the images are output in parallel.

The fusing module 802 is adapted to fuse the images having different intensity values according to the intensity mapping relation between each two frames of images in the images having different intensity values, and to obtain the fused image.

Figure 9:
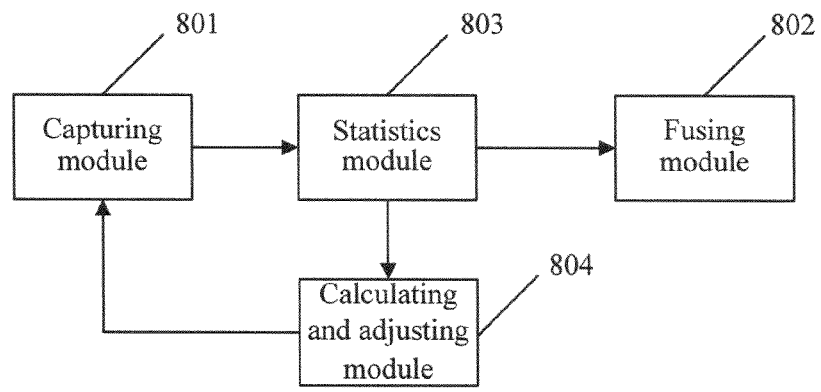
FIG. 9 is a schematic structural view of another system for fusing the images according to embodiment 2 of the present invention.

Referring to FIG. 9, the system further includes a statistics module 803.

The statistics module 803 is adapted to calculate an intensity mapping function f(x) between each two frames of images according to an intensity histogram and an intensity cumulative histogram of each frame of image having different intensity values captured by the capturing module 801, in which x represents the intensity value of the pixel location in the bright image, and f(x) represents the intensity value of the pixel location of the corresponding position in the dark image. Each group of x and f(x) is referred to as a mapping pair, and a value obtained by subtracting f(x) from x is referred to as a mapping difference. The statistics module 803 is further adapted to determine a mapping pair, and use the determined mapping pair as the mapping relation.

For ease of description, the two frames of images captured under the two exposure situations, that is, the bright exposure and the dark exposure are set as an example for description.

Referring to FIGS. 3(a) and 3(b), the images captured under the bright exposure and the dark exposure situations are shown, FIG. 3(a) is the bright exposure image, and the FIG. 3(b) is the dark exposure image. FIG. 4(a) is the intensity histogram of the bright and the dark images, the horizontal axis of the intensity histogram represents the intensity levels, from the left 0 (dark tone) to the right 255 (bright tone), the intensity levels of the image are divided into 256 levels, and the vertical axis represents the number of the pixels under each intensity level, the numerical value points on the vertical axis are connected, and the intensity histogram is obtained. FIG. 4(b) is the intensity cumulative histogram of the bright and the dark images, in which a curve 1 represents the bright exposure image, and a curve 2 represents the dark exposure image. FIG. 4(c) is an intensity mapping function view calculated according to the intensity histogram of the bright and the dark images as shown in FIG. 4(a) and the intensity cumulative histogram as shown in FIG. 4(b), in which the calculating process is the same as that of the prior art, so it is not described here. The horizontal coordinate of the intensity mapping function view represents the pixel of the bright image, and the vertical coordinate of the intensity mapping function view represents the pixel of the dark image. The intensity mapping function may be understood as that the pixel having the intensity value of x in the bright image should be f(x) in the dark image, in which x>=f(x). From the discrete angle, f should be a many-to-many function. However, f may be understood as a successive function, so that f becomes a monotonously incremental function. In the detail calculation, x and f(x) are rounded down for calculation, if other numerical values are used, the result is not affected, in which a difference between x and f(x) is the mapping difference.

The intensity information includes any one or several combinations of the exemplified information as follows: the number of the dark pixels or the number of the bright pixels in the bright image, the number of the bright pixels or the dark pixels in the dark image, the total or the partial average value of the bright and the dark images, and the mid value and the mapping difference of the bright and the dark images etc.

In one embodiment, a mapping pair $(x_{max}, f(x_{max}))$ corresponding to the maximum mapping difference $EDR_{max}$ is used as the mapping information.

$$EDR_{max} = \max\{x - f(x)\}\ x \in [0,255] \quad (1)$$

The mapping pair corresponding to the maximum mapping difference is selected as the mapping information, so that the dynamic range of the finally fused image is the maximum. Definitely, the mapping pairs corresponding to other mapping differences may be selected as the mapping information, that is, in the intensity mapping function curve, x and the corresponding f(x) is the mapping pair serving as the mapping information.

Being an important index in the solution, EDR may directly measure the enhanced dynamic range, and may represent whether the current exposure time is appropriate or not.

For the multi-exposure situation, that is, the image to be fused includes more than two images having different exposures, the images are sequenced from bright to dark according to the different exposure time, and one intensity mapping function $f_n$ may be calculated between each two neighboring images. Formula 1 thus becomes Formula (2). It is easily known that the EDR of the n frames is practically a sum of the irrelevant EDRs of n−1 2 frames. Similarly, the mapping information is as follows.

$$\left\{ \begin{array}{c} (x_{max1}, f_1(x_{max1})), (x_{max2}, f_2(x_{max2})) \ldots \\ (x_{max(n-1)}, f_{(n-1)}(x_{max(n-1)})) \end{array} \right\} \quad (2)$$

$$EDR_{maxk} = \max\{x_k - f_k(x_k)\}x_k \in [0,255]$$

$$EDR_{max} = \sum_{i=1}^{n-1} EDR_{maxi}$$

The system further includes a calculating and adjusting module 804.

The calculating and adjusting module 804 is adapted to make statistics on the intensity histogram of each frame of image captured by the capturing module 801, to obtain intensity information, to adjust reference exposure time and exposure dynamic time according to the intensity information, to calculate the exposure time of each frame of image of for a next capturing according to the reference exposure time and the exposure dynamic time, and to give a feedback of the exposure time to the capturing module 801.

The reference exposure time is set to Ter, the reference exposure time is a reference value of the exposure time capable of representing the scene intensity, so as to avoid the exposure image sequence from being too bright or too dark. The reference exposure time is usually the mid value of the exposure time sequence in the multi-exposure, the dark exposure time is Td, and the bright exposure time is Tb. The exposure time dynamic value is Ted, the exposure time dynamic value is an offset coefficient of the multi-exposure time, and is adapted to determine the intensity dynamic range capable of being covered by the multi-exposure sequence. The exposure time dynamic value is usually the difference value of the neighboring exposure time in the multi-exposure, and may be represented as a ratio of the neighboring exposure time.

Figure 11:
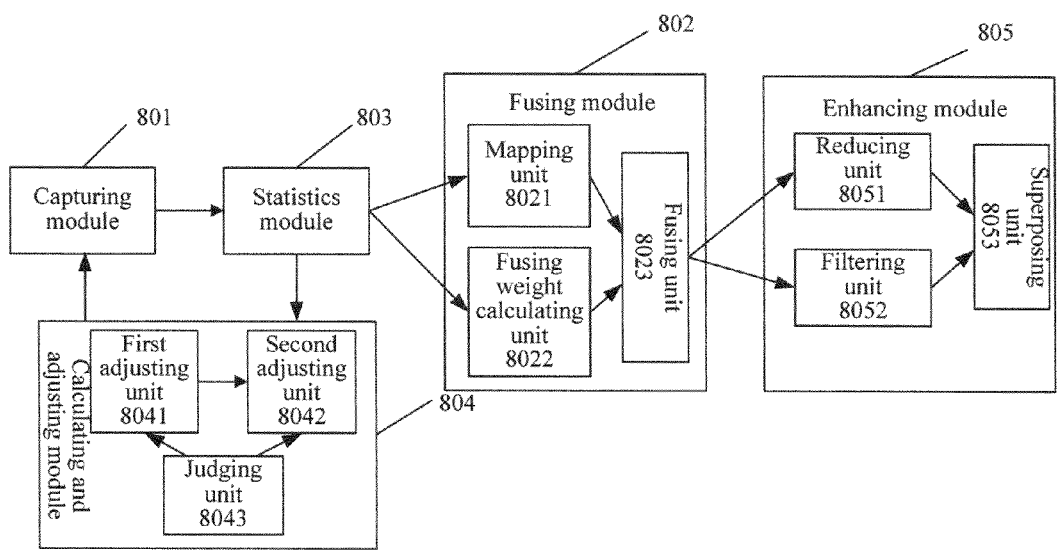
FIG. 11 is a schematic detailed structural view of the system for fusing the images according to embodiment 2 of the present invention.

Referring to FIG. 11, the calculating and adjusting module 804 includes a first adjusting unit 8041, a second adjusting unit 8042, and a judging unit 8043.

The first adjusting unit 8041 is adapted to adjust the reference exposure time Ter, so that the intensity information is within a preset threshold value range, and to adjust the exposure time dynamic value Ted according to the mapping pair obtained by the statistics module, so that the exposure time dynamic value Ted may well cover the scene intensity.

Under the dual-exposure situation, it is specified that Ter=Td. Under the n-exposure situation, it is specified that the reference exposure time Ter is the value of the n/2th exposure image sequence from dark to bright: Ter=T(n/2).

In one embodiment, Ted is adjusted by adopting the maximum mapping difference $EDR_{max}$, and under the dual-exposure situation, a desired effect may be obtained when the value of $EDR_{max}$ is between 140 and 180.

The second adjusting unit 8042 is adapted to keep the exposure time dynamic value Ted constant, and to adjust the reference exposure time into the preset threshold value range.

The judging unit 8043 is adapted to judge whether a dynamic range is changed or not in a fixed period, and if the dynamic range is changed, notify the first adjusting unit 8041 to re-adjust the reference exposure time until the reference exposure time is within the preset threshold value range; if the dynamic range is not changed, judge whether the scene intensity is changed or not, and if the scene intensity is changed, notify the second adjusting unit 8042 to keep the exposure time dynamic value constant, and adjust the reference exposure time into the preset threshold value range; if the scene intensity is not changed, wait for a next period, and judge whether the dynamic range is changed or not.

Under the dual-exposure situation, according to the specification, Ter=Td and Tb=Ter+Ted, and the exposure time of the [bright, dark, bright, dark . . . ] alternating manner is set for the image capturing device according to the practical platform, so as to achieve the exposure alternating object.

Under the n types of exposures situation, T(i)=Ter+(i−n/2)Ted, the exposure time of the alternating manner from bright to dark may be set for the image capturing device. For example, 4 types of exposures exist, the 4 types of exposures are sequenced from bright to dark, the exposure time of the 4 types of exposures are respectively 4, 3, 2, and 1, and then, the sequence is circulated, that is, 4, 3, 2, 1, and 4, 3, 2, 1 . . . .

For the high speed image capturing device, the shooting with the total dynamic range is realized by adopting the fixed multi-exposure, and the automatic exposure control is no more required.

Referring to FIG. 11, the fusing module 802 includes a mapping unit 8021, a synthesis weight calculating unit 8022, and a fusing unit 8023.

The mapping unit 8021 is adapted to calculate an intensity value of each frame of the mapped image according to the mapping pair determined by the statistics module 803.

In one embodiment, the intensity value of the mapping image under the dark exposure is calculated by adopting the mapping pair $(x_{max}, f(x_{max}))$ corresponding to the maximum mapping difference. It is assumed that $I_1$ is the intensity value of the bright exposure image, and $I_2$ is the intensity value of the dark exposure image, after being mapped, the intensity value $I_2$ of the dark exposure image is $(I_2+x_{max}-f(x_{max}))$.

The synthesis weight calculating unit 8022 is adapted to calculate a synthesis weight of each frame of image according to the mapping pair determined by the statistics module 803.

In one embodiment, $s'_1$ is the synthesis weight of the bright exposure image, $s'_1$ is a Gauss weight calculated by using 0 as a center and Xmax as a radius, and a detailed calculating formula is as shown in the formula as follows. $s'_2$ is the synthesis weight of the dark exposure image, $s'_2$ is the Gauss weight calculated by using 255 as the center and f(Xmax) as the radius, and the detailed calculating formula is as shown in Formula (3).

$$s'_1 = \exp\left(-4 * \frac{I_1^2}{x_{max}^2}\right) \quad (3)$$

$$s'_2 = \exp\left(-4 * \frac{(255 - I_2)^2}{f(x_{max})^2}\right)$$

For ease of the subsequence calculation, the synthesis weight of each image may be normalized. Formula (3) is normalized to form Formula (4).

$$s_1 = \frac{s'_1}{s'_1 + s'_2} \quad (4)$$

$$s_2 = 1 - s_1$$

Through a simplifying operation, Formula (4) may be simplified to table look-up, addition, and three multiplications.

For the n types of exposures situation, the synthesis weight is as shown in Formula (5).

$$s'_k = \begin{cases} \exp\left(-4 * \frac{I_k^2}{x_{max1}^2}\right) & k = 1 \\ \exp\left(-4 * \frac{(2I_k - x_{maxk} - f_{(k-1)}(x_{max(k-1)}))^2}{(x_{maxk} - f_{(k-1)}(x_{max(k-1)}))^2}\right) & k = 2 \ldots (n-1) \\ \exp\left(-4 * \frac{(255 - I_k)^2}{f_{(n-1)}(x_{max(n-1)})^2}\right) & k = n \end{cases} \quad (5)$$

After being normalized, it is as shown in Formula (6)

$$s_k = \frac{s'_k}{\sum_{i=1}^{n} s'_i} \quad (6)$$

The fusing unit 8023 is adapted to fuse the images having different intensity values captured by the capturing module 801 according to the intensity value of each frame of image obtained by the mapping unit 8021 and the corresponding synthesis weight calculated by the synthesis weight calculating unit 8022, and obtain the fused image, that is, the image having the enhanced dynamic range.

Further, for the above example, it is set that the chroma of the bright exposure image is $C_1$, the chroma of the dark exposure image is $C_2$, the intensity I and the chroma C after the weighting superposition are as shown in Formula (7).

$$I=s_1*I_1+s_2*(I_2+x_{max}-f(x_{max}))$$

$$C=s_1*C_1+s_2*C_2 \quad (7)$$

Formula (7) may be simplified to two multiplications and five additions, which may be easily realized in the software and hardware design.

For the n types of exposures situation, the intensity value of each image is respectively $I_1, I_2, \ldots, I_n$, and the chroma value of each image is respectively $C_1, C_2, \ldots, C_n$. The intensity value and the chroma value after the weighting superposition are as shown in Formula (8).

$$I = s_1 * I_1 + \sum_{i=2}^{n} s_i * \left( I_i + \sum_{k=1}^{i-1} x_{maxk} - \sum_{k=1}^{i-1} f_k(x_{maxk}) \right) \quad (8)$$

$$C = \sum_{i=1}^{n} s_i * C_i$$

The fused image is as shown in FIG. 3(c).

FIG. 7 is a schematic flow of fusing the images having the large dynamic range. m is the dynamic range of the image captured under the bright exposure, and n is the dynamic range of the intensity of the image captured under the dark exposure. The dynamic ranges of the intensity of the captured bright exposure image and the captured dark exposure image capture image are the same. In the drawing, the lengths of m and n are the same, but the captured intensity range interval is changed. For example, as compared with the bright exposure image, in the dark exposure image, the captured interval is moved towards right for a distance of g, so that the valid interval of the dynamic range corresponding to the fused image relevantly becomes m+g. The line 1 in the drawing represents that the scene information here is completed without being lost, the line 2 represents that the scene information here is lost. In the bright exposure image, the scene information on the right of the intensity dynamic range is lost, and in the dark exposure image, the scene information on the left of the intensity dynamic range is lost. In the fused image, the scene information on the two sides of the intensity dynamic range is not lost.

Figure 10:
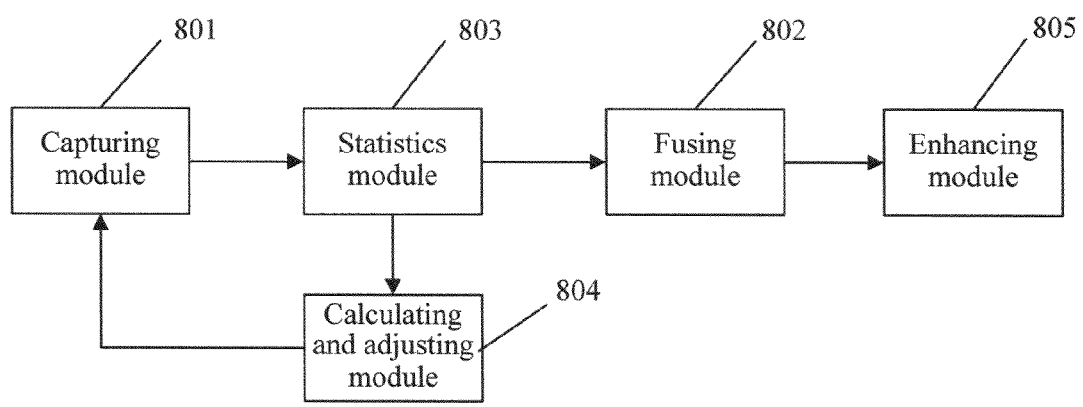
FIG. 10 is a schematic structural view of the system for fusing the images after an intensity enhancement according to embodiment 2 of the present invention.

Referring to FIG. 10, the system further includes an enhancing module 805.

The enhancing module 805 is adapted to perform an intensity enhancement for the fused image having the enhanced dynamic range obtained by the fusing module 802, in which the details are emphasized, so as to obtain a better display effect.

Referring to FIG. 11, the enhancing module includes a scaling-down unit 8051, a filtering unit 8052, and a superposing unit 8053.

The scaling-down unit 8051 is adapted to scale down an intensity channel of the image fused by the fusing module 802.

In one embodiment, the proportional coefficient of scaling-down the intensity channel is approximately described as follows:

$$\delta = \frac{255}{255 + \sum_{i=1}^{n-1} x_{maxi} - \sum_{i=1}^{n-1} f_i(x_{maxi})}$$

The filtering unit 8052 is adapted to perform a bilateral filtering on the image fused by the fusing module 802.

The superposing unit 8053 is adapted to superpose the image scaled down by the scaling-down unit 8051 and the image filtered by the filtering unit 8052, and to obtain a new fused image. The intensity of the new fused image is stronger than the intensity of the fused image obtained by the fusing module 802.

Particularly, the filtering unit 8052 adopts the bilateral filter formed by mixing the window filtering of the space and the triangle filtering of the intensity domain for filtering, the reason is that the complexity of the bilateral filter composed of the typical dual-Gauss is much higher than the complexity of the commonly used single filter, and usually the complexity is increased in index with the size of the window of the filter, and a great amount of resources is consumed.

After the intensity channel of the image is scaled down and the image is filtered, the image intensity is enhanced to be as follows:

$$I_{en} = \delta * I + \alpha * (I - I_{bilateral}) \quad (9)$$

where, $I_{en}$ is the intensity of the enhanced image, $I_{bilateral}$ is the intensity of the filtered image, $\alpha$ is a weighting coefficient. When the value of $\alpha$ is 0.5, a relatively good effect may be obtained. If the images having multi-exposure are fused, $\alpha$ is increased accordingly.

As shown in Formula. (9), the details of the image may be obtained by subtracting the filtered image from the image before being filtered, and after the weighting superposition is performed on the image having the scaled-down intensity, the HDR image having abundant details may be obtained, as shown in FIG. 3(d).

In the system for fusing the images according to one embodiment, at least two frames of images having different intensity values under the different exposure time in the same scene are captured. The plurality of frames of images having different intensity values are fused according to the intensity mapping relation between each two frames of images, and the fused image is obtained. In the system, the structure of the existing image capturing device, for example, the camera is not altered, and the method may be realized by using an exposure setting function and an additive software module of the existing image capturing device. The system has a wide application range, and the system may be integrated to a system of the image capturing device and monitoring device, or may be used as the post processing software. The system has a good expandability, and is easily updated later. The system has better fusing effect than that of the common image capturing device. The details are distinctive, particularly in the scene having the high intensity value and the low intensity value, the feature details having the large intensity range may be clearly obtained. The fused image does not have the fused trace, it is smooth and natural in the bright and the dark regions, and the transition between the bright and the dark is wholly uniform. The images are output in parallel, so that the frame rate of the image capturing device is not reduced, and the output image frequency is equal to the output frame rate of the original image capturing device. The algorithm is practical and highly efficient, and the real-time effect is achieved without increasing the hardware cost.

Those of ordinary skill may understood that all or a part of the flow in the embodiment of the method is finished by instructing the related hardware through a computer program, in which the programs may be stored in a computer readable storage medium. When the program is executed, the flow of the embodiments of the method is performed. The storage medium may be a magnetic disk, an optic disk, a read-only memory (ROM), or a random access memory (RAM) etc.

Finally, it should be understood that the above embodiments are only used to explain, but not to limit the technical solution of the present invention. In despite of the detailed description of the present invention with referring to above preferred embodiments, it should be understood that various modifications, changes or equivalent replacements can be made by those skilled in the art without departing from the spirit and scope of the present invention and covered in the claims of the present invention.

What is claimed is:

1. A method for fusing images, comprising:

capturing by an image capturing device at least two frames of the images having different intensity values under different exposure time in a same scene;

calculating an intensity mapping function between each two frames of the images according to an intensity histogram and an intensity cumulative histogram of each frame of the images, the intensity mapping function is a function between x and f(x), wherein x represents the intensity value of a pixel located at a certain position in a bright image of the two frames, f(x) represents the intensity value of the pixel located at the certain position in a dark image of the two frames, each group of x and f(x) in the intensity mapping function is referred to as a mapping pair and a plurality of mapping pairs are obtained, and a value obtained by subtracting f(x) from x is referred to as a mapping difference;

selecting the mapping pair from the plurality of the mapping pairs according to the maximum mapping difference $EDR_{max}$ and using the selected mapping pair as an intensity mapping relation, wherein $EDR_{max} = \max\{x - f(x)\}$; and calculating an intensity value of each frame of the mapped images according to the determined mapping pair, calculating a fusing weight of each frame of the images according to the determined mapping pair by the formula $$s'_k = \begin{cases} \exp\left(-4 * \dfrac{I_k^2}{x_{max1}^2}\right) & k = 1 \\ \exp\left(-4 * \dfrac{(2I_k - x_{maxk} - f_{(k-1)}(x_{max(k-1)}))^2}{(x_{max\ k} - f_{(k-1)}(x_{max(k-1)}))^2}\right) & k = 2 \ldots (n-1) \\ \exp\left(-4 * \dfrac{(255 - I_k)^2}{f_{(n-1)}(x_{max(n-1)})^2}\right) & k = n \end{cases}$$

wherein $I_k$ is the intensity value of $k^{th}$ image in n exposure images; and fusing a plurality of the frames of the images by the intensity value of each frame of the mapped images and the corresponding fusing weight of each frame of the images, and obtaining the fused image.

2. The method according to claim 1, further comprising:

obtaining intensity information by making statistics on the intensity histogram of each frame of the images; and adjusting a reference exposure time and an exposure dynamic time according to the intensity information, and calculating an exposure time of each frame of the images for a next capturing according to the reference exposure time and the exposure dynamic time.

3. The method according to claim 2, wherein the adjusting the reference exposure time and the exposure dynamic time according to the intensity information comprises:

adjusting the reference exposure time to make the intensity information fall into a first preset range;

adjusting an exposure time dynamic value according to the mapping relation;

keeping the exposure time dynamic value constant, and adjusting the reference exposure time into a second preset range;

judging whether a dynamic range is changed or not in a fixed period, and re-adjusting the reference exposure time until the reference exposure time is within the second preset range if the dynamic range is changed, wherein the dynamic range is ratio of a brightest part to a darkest part of the image; and judging whether a scene intensity is changed or not if the dynamic range is not changed, keeping the exposure time dynamic value constant and adjusting the reference exposure time into the second preset threshold value range if the scene intensity is changed, and waiting for a next period and judging whether the dynamic range is changed or not if the scene intensity is not changed.

4. The method according to claim 3, wherein the fusing the images having the different intensity values according to the intensity mapping relation between each two frames of the images, and obtaining the fused image comprises:

calculating an intensity value of each frame of the mapped images according to the determined mapping pair and calculating a fusing weight of each frame of the images according to the determined mapping pair; and fusing a plurality of the frames of the images by the intensity value of each frame of mapped image and the corresponding fusing weight of each frame of the images, and obtaining the fused image.

5. The method according to claim 2, wherein the fusing the images having the different intensity values according to the intensity mapping relation between each two frames of the images, and obtaining the fused image comprises:

calculating an intensity value of each frame of the mapped images according to the determined mapping pair and calculating a fusing weight of each frame of the images according to the determined mapping pair; and fusing a plurality of the frames of the images by the intensity value of each frame of mapped image and the corresponding fusing weight of each frame of the image, and obtaining the fused image.

6. The method according to claim 1, further comprising:

performing an intensity enhancement for the fused image.

7. The method according to claim 6, wherein the performing the intensity enhancement for the fused image comprises:

proportionally scaling down an intensity channel of the fused image, performing a bilateral filtering, superposing the scaled-down fused image and the image after the bilateral filtering, and obtaining a new fused image, wherein an intensity of the new fused image is stronger than the intensity of the scaled-down fused image.

8. The method according to claim 6, wherein the performing the intensity enhancement for the fused image comprises:

proportionally scaling down an intensity channel of the fused image to obtain a scaled-down fused image;

performing a bilateral filtering on the fused image to obtain a filtered image; and superposing the scaled-down fused image and the filtered image, and obtaining a new fused image, wherein an intensity of the new fused image is stronger than the intensity of the scaled-down fused image.

9. A system for fusing images, comprising:

an image capturing device, configured to capture at least two frames of the images having different intensity values under different exposure time in a same scene;

a statistics module, configured to calculate an intensity mapping function between each—two frames of the images according to an intensity histogram and an intensity cumulative histogram of each frame of the images, the intensity mapping function is a function between x and f(x), where x represents the intensity value of a pixel located at a certain position in a bright image of the two frames, f(x) represents the intensity value of the pixel located at the certain position in a dark image of the two frames, each group of x and f(x) is referred to as a mapping pair and a plurality of mapping pairs are obtained, and a value obtained by subtracting f(x) from x is referred to as a mapping difference; and configured to select the mapping pair from the plurality of the mapping pairs according to the maximum mapping difference $EDR_{max}$ and use the selected mapping pair as an intensity mapping relation, wherein $EDR_{max}=\max\{x-f(x)\}$; and a fusing module, configured to fuse the images having different intensity values according to the intensity mapping relation and obtain a fused image; wherein the fusing module comprises:

a mapping unit configured to calculate an intensity value of each frame of the mapped images according to the mapping pair determined by the statistics module;

a synthesis weight calculating unit, configured to calculate a synthesis weight of each frame of the images according to the mapping pair by the formula $$s'_k = \begin{cases} \exp\left(-4 * \dfrac{I_k^2}{x_{max1}^2}\right) & k=1 \\ \exp\left(-4 * \dfrac{(2I_k - x_{maxk} - f_{(k-1)}(x_{max(k-1)}))^2}{(x_{max\ k} - f_{(k-1)}(x_{max(k-1)}))^2}\right) & k=2\ldots(n-1) \\ \exp\left(-4 * \dfrac{(255 - I_k)^2}{f_{(n-1)}(x_{max(n-1)})^2}\right) & k=n \end{cases}$$

wherein $I_k$ is the intensity value of $k^{th}$ image in n exposure images; and a superposing unit, configured to perform a weighting superposing according to the intensity value of each frame of the images obtained by the mapping unit and the corresponding synthesis weight calculated by the synthesis weight calculating unit, and obtain the fused image.

10. The system according to claim 9, further comprising:
a calculating and adjusting module configured to make statistics on the intensity histogram of each frame of images and obtain intensity information; and adjust a reference exposure time and an exposure dynamic time according to the intensity information, and calculate exposure time of each frame of the images for a next capturing according to the reference exposure time and the exposure dynamic time.

11. The system according to claim 10, wherein the calculating and adjusting module comprises:
a first adjusting unit configured to adjust the reference exposure time to make the intensity information obtained by the statistics module be within a first preset range, and configured to adjust an exposure time dynamic value according to the mapping relation obtained by the statistics module;
a second adjusting unit configured to keep the exposure time dynamic value constant, and adjust the reference exposure time into a second preset range; and
a judging unit configured to judge whether a dynamic range is changed or not according to a fixed period, notify the second adjusting unit to re-adjust the reference exposure time until the reference exposure time is within the second preset range if the dynamic range is changed, and judge whether a scene intensity is changed or not if the dynamic range is not changed; and notify the second adjusting unit to keep the exposure time dynamic value constant and adjust the reference exposure time into the second preset range if the scene intensity is changed, and wait for a next period and judge whether the dynamic range is changed or not if the scene intensity is not changed.

12. The system according to claim 9, further comprising:
an enhancing module configured to perform an intensity enhancement for the fused image obtained by the fusing module.

13. The system according to claim 12, wherein the enhancing module comprises:
a scaling-down unit configured to scale down an intensity channel of the image fused by the fusing module and obtain a scaled-down image;
a filtering unit configured to perform a bilateral filtering on the image fused by the fusing module and obtain a filtered image; and
a superposing unit configured to superpose the scaled-down image by the scaling-down unit and the filtered image by the filtering unit, and obtain a new fused image, wherein the intensity of the new fused image is stronger than the intensity of the fused image.

14. A non-transitory computer readable storage medium, comprising computer program codes which when executed by a computer processor causes the computer processor to execute the following:
capturing at least two frames of images having different intensity values under different exposure time in a same scene;
calculating an intensity mapping function between each two frames of the images according to an intensity histogram and an intensity cumulative histogram of each frame of the images, the intensity mapping function is a function between x and f(x), wherein x represents the intensity value of a pixel located at a certain position in a bright image of the two frames, f(x) represents the intensity value of the pixel located at the certain position in a dark image of the two frames, each group of x and f(x) in the intensity mapping function is referred to as a mapping pair and a plurality of mapping pairs are obtained, and a value obtained by subtracting f(x) from x is referred to as a mapping difference;
selecting the mapping pair from the plurality of the mapping pairs according to the maximum mapping difference $EDR_{max}$ and using the selected mapping pair as an intensity mapping relation, wherein $EDR_{max}=\max\{x-f(x)\}$; and
calculating an intensity value of each frame of the mapped images according to the determined mapping pair, calculating a fusing weight of each frame of the images according to the determined mapping pair by the formula $$s'_k = \begin{cases} \exp\left(-4 * \dfrac{I_k^2}{x_{max1}^2}\right) & k=1 \\ \exp\left(-4 * \dfrac{(2I_k - x_{maxk} - f_{(k-1)}(x_{max(k-1)}))^2}{(x_{max\ k} - f_{(k-1)}(x_{max(k-1)}))^2}\right) & k=2\ldots(n-1) \\ \exp\left(-4 * \dfrac{(255 - I_k)^2}{f_{(n-1)}(x_{max(n-1)})^2}\right) & k=n \end{cases}$$

wherein $I_k$ is the intensity value of $k^{th}$ image in n exposure images; and fusing a plurality of the frames of the images by the intensity value of each frame of the mapped images and the corresponding fusing weight of each frame of the images, and obtaining the fused image.

\* \* \* \* \*